(12) United States Patent
Jaladanki et al.

(10) Patent No.: US 9,122,599 B1
(45) Date of Patent: Sep. 1, 2015

(54) METHOD AND APPARATUS FOR EMBEDDING DIAGNOSTIC INFORMATION IN A SNMP RESPONSE FOR FAILURE ANALYSIS

(71) Applicants:Malyadri Jaladanki, San Jose, CA (US); Gilbert Levesque, Palo Alto, CA (US)

(72) Inventors: Malyadri Jaladanki, San Jose, CA (US); Gilbert Levesque, Palo Alto, CA (US)

(73) Assignee: Tellabs Operations, Inc., Naperville, IL (US)

( * ) Notice: Subject to any disclaimer, the term of this patent is extended or adjusted under 35 U.S.C. 154(b) by 169 days.

(21) Appl. No.: 13/671,436

(22) Filed: Nov. 7, 2012

(51) Int. Cl.
*G06F 11/00* (2006.01)
*G06F 11/07* (2006.01)
*H04L 12/24* (2006.01)

(52) U.S. Cl.
CPC ........ *G06F 11/0766* (2013.01); *G06F 11/0775* (2013.01); *H04L 41/06* (2013.01)

(58) Field of Classification Search
USPC .................. 714/4.1, 26, 48; 709/223, 224
See application file for complete search history.

(56) References Cited

U.S. PATENT DOCUMENTS

2009/0204697 A1* 8/2009 Jaladanki et al. ............. 709/223

* cited by examiner

*Primary Examiner* — Yolanda L Wilson
(74) *Attorney, Agent, or Firm* — James M. Wu; JW Law Group (57) ABSTRACT

A process or method for embedding diagnostic information in a Simple Network Management Protocol ("SNMP") response during an occurrence of provisioning error is disclosed. A network element ("NE"), in one embodiment, is able to detect an operation failure while performing a GET or a SET request from a network manager. If the enhanced diagnostic code notification is registered between the NE and manager, the NE composes a response message such as GET-RESPONSE to include a standard error code as well as an enhanced diagnostic code. The enhanced diagnostic code includes diagnostic information associated with the operation failure. After transmitting the response to the network manager, the enhanced diagnostic code is subsequently decoded in accordance with enhanced diagnostic information stored in a network manager database.

20 Claims, 9 Drawing Sheets

OPERATIONS IN A ENHANCED CODE SYSTEM (EDCS) NETWORK

FIG. 1

FIG 2  NETWORK ELEMENT AND MANAGER USING ENHANCED DIAGNOSTIC CODE SYSTEMS (EDCS)

FIG. 3   OPERATIONS IN A ENHANCED CODE SYSTEM (EDCS) NETWORK

500 ⟶

STANDARD SNMP ERROR CODES

- *NO_ERROR (0) -> The request has been processed successfully*
- *TOO_BIG (1)*
- *NO_SUCH_NAME (2)*
- *BAD_VALUE (3)*
- *READ_ONLY (4)*
- *GENERAL_ERROR (5)*

*Following error codes are used only in SNMPV2 and V3*

- *NO_ACCESS (6)*
- *WRONG_TYPE (7)*
- *WRONG_LENGTH (8)*
- *WRONG_ENCODING (9)*
- *WRONG_VALUE (10)*
- *NO_CREATION (11)*
- *INCONSISTENT_VALUE (12)*
- *RESOURCE_UNAVAILABLE (13)*
- *COMMIT_FAILED (14)*
- *UNDO_FAILED (15)*
- *AUTHORIZATION_ERROR (16)*
- *NOT_WRITABLE (17)*
- *INCONSISTENT_NAME (18)*

FIG.5

NETWORKS WITH A MIX OF STANDARD ERROR CODE AND EDC IMPLEMENTATION

FIG 6

FIG. 7   DECODING ENHANCED DIAGNOSTIC CODE

FIG. 8  ENHANCED DIAGNOSTIC CODE IMPLEMENTATION

FIG 9  ENHANCED DIAGNOSTIC CODE EXECUTION

METHOD AND APPARATUS FOR EMBEDDING DIAGNOSTIC INFORMATION IN A SNMP RESPONSE FOR FAILURE ANALYSIS

FIELD

The exemplary embodiment(s) of the present invention relates to network systems. More specifically, the exemplary embodiment(s) of the present invention relates to providing diagnostic information via a SNMP Response for failure analysis.

BACKGROUND

A high-speed network environment typically includes network devices such as routers and switches used for transferring packets and/or data traffic from sources to destinations. The network environment may include one or more communication networks such as IP and/or packet-based networks. Depending on forwarding addresses, data packets are typically routed by one or more network devices or nodes via a communication network such as Internet and/or Ethernet. The number of network devices or nodes in a network environment can change over time because the configuration of the network constantly changes. For example, new devices may be added while existing attached devices may be deactivated and/or removed.

In order for a high-speed network to function properly, the network, which generally includes various attached network devices, is typically required to be initialized or identified via a discovery process. For example, the network services which are assigned to various users in a customer relationship management ("CRM") are typically required to be provisioned before the services can be delivered to the users and/or customers. However, a problem associated with a conventional network provisioning is that a failure or error message occurred during a provisional phase typically lacks specific information that can assist a network administrator in debugging and/or fixing the failure in a timely manner. For example, a Simple Network Management Protocol ("SNMP") network generally provides a set of generic error codes that do not provide specific source and/or reasons for provisioning failures. The software module, which is responsible for the failure or responsible for causing the error, is typically not identified via standard SNMP error code during a provisioning command failure there by increasing the time taken in arriving at a root cause analysis and subsequently fixing the underlying problem.

A conventional approach to handle such failure(s) is to develop a scheme of narrowing down the source of failures by issuing multiple follow-up network messages. Multiple follow-up network messages typically consume resources, traffic, and time. For example, to identify a source of error, additional queries may be issued and/or broadcasted.

SUMMARY

A process or method for embedding diagnostic information in a Simple Network Management Protocol ("SNMP") response during an occurrence of provisioning error is disclosed. A network element ("NE"), in one embodiment, is able to detect an operation failure while performing a GET request or a SET request from a network manager. If the enhanced diagnostic code notification is registered between the NE and manager, the NE composes a response message such as GET-RESPONSE to include a standard error code as well as an enhanced diagnostic code. The enhanced diagnostic code includes diagnostic information associated with the operation failure. After transmitting the response to the network manager, the enhanced diagnostic code is subsequently decoded in accordance with enhanced diagnostic information database stored in a network manager.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus that provides diagnostic information embedded in a SNMP Response for assisting in failure analysis.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention discloses a process for managing network devices using Enhanced Diagnostic Code System ("EDCS") for failure diagnosis. A network element ("NE"), in one embodiment, is able to detect an operation failure while performing a GET Request or a SET Request from a network manager. If the enhanced diagnostic code notification is registered between the NE and manager, the NE composes a response message such as GET-RESPONSE to include a standard error code as well as an enhanced diagnostic code. For example, upon determining that the enhanced diagnostic code notification is registered, a response message such as GET-RESPONSE carrying a standard error code and an enhanced diagnostic code is generated. Note that the enhanced diagnostic code, in one aspect, indicates diagnostic information associated with the operation failure. For example, the enhanced diagnostic code may identify which module failed. After transmitting the response to the network manager such as a network management system ("NMS"), the enhanced diagnostic code is decoded in accordance with information stored in a NMS database.

Figure 1:
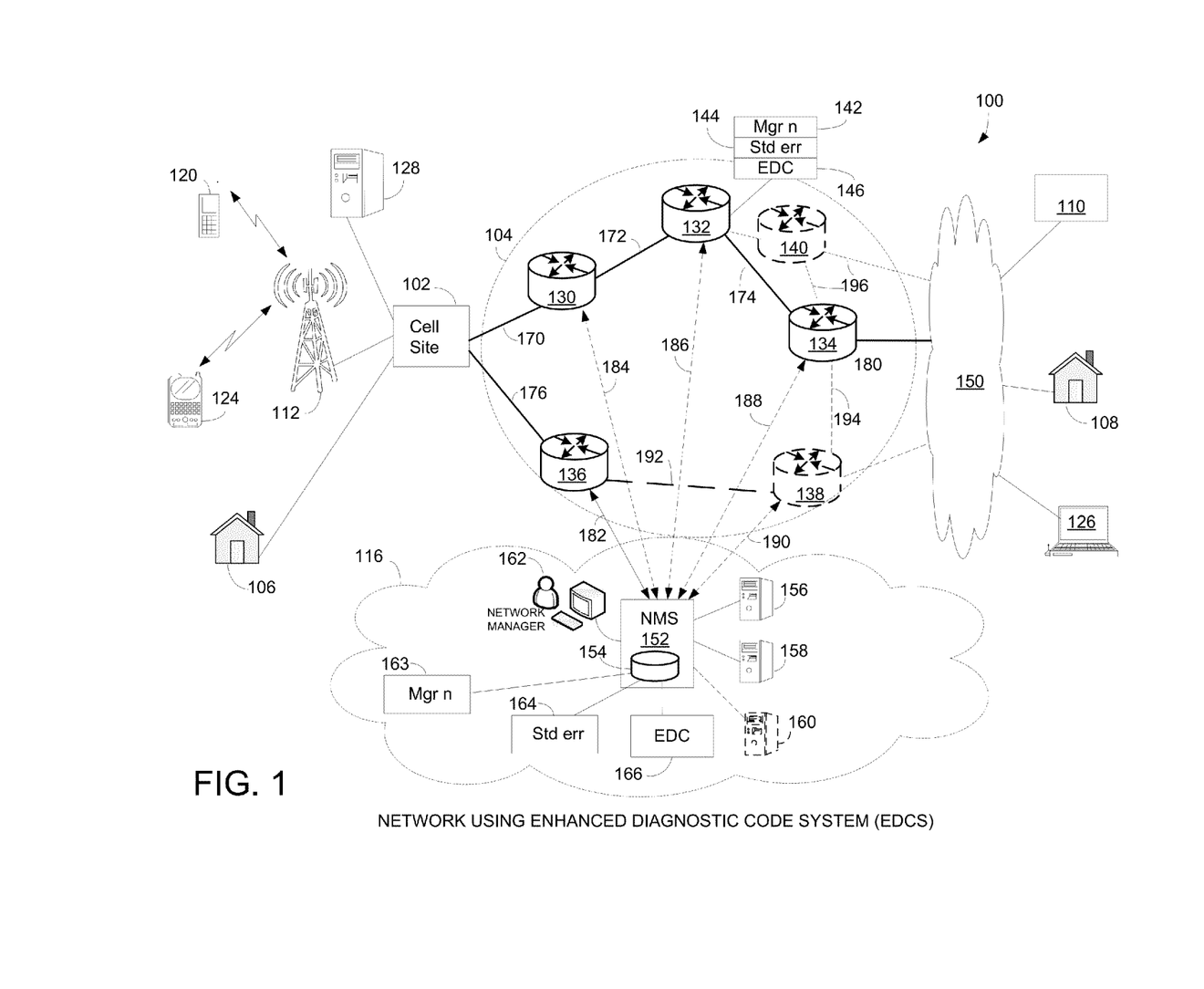
FIG. 1 is a block diagram illustrating a network configuration having multiple network devices and/or nodes capable of using enhanced diagnostic code system ("EDCS") in accordance with one embodiment of the present invention.

FIG. 1 is a block diagram 100 illustrating a network configuration having multiple network devices and/or nodes capable of using EDCS in accordance with one embodiment of the present invention. The EDCS, in one embodiment, provides diagnostic information in a response message such as a SNMP response to debug provisioning failures. Diagram 100 includes a cell site 102, a switching network 104, a central office ("CO") 116, and Internet 150. Internet 150 is further coupled to a user 108, a content provider 110 such as a website, and a host 126. CO 116 provides network management to facilitate network communication between users 106-108 via switching network 104, Internet 150, and cell site 102. It should be noted that the underlying concept of the exemplary embodiment(s) of the present invention would not change if one or more blocks (or devices) were added to or removed from diagram 100.

Cell site 102 is capable of communicating with mobile devices such as cellular phone 120 and handheld device 124 via radio tower 112. It should be noted that cell site 102 may include additional radio towers as well as other land based switching circuitry. The cell stations such as cell site 102 can be configured to support wireless communications as well as wired communications.

Switching network 104 is configured to route information (or data packets) between users and/or providers connected to the network. Network 104 includes NEs 130-140 which are also known as nodes and/or routers. An NE is a logical network entity able to manage one or more physical network devices. The physical network devices include routers, modems, hubs, bridges, servers, switches, et cetera. NEs 130-136 are interconnected via connections 170-176 and are used for routing information and/or data packets to and from network clients and/or hosts. Network client in one example may include one or more routers, switches, hosts, users, base stations, and the like. For example, switching network 104 uses NEs 130-134 to route a packet stream from users 106 to 108 via cell site 102 and Internet 150.

NEs 130-140, in one aspect, can be routers, switches, bridges, or a combination of routers, switches, and bridges. The total number of NEs attached to switching network 104 may increase or decrease over time depending on the demand of network services. For example, with increasing demand of video streaming, the number of NEs as illustrated in diagram 100 can grow to meet such demand. One aspect of network growth is to add additional NEs into an existing pool of NEs to expand processing and/or service capacity. For instance, NEs 138-140 are recently added NEs to the pool of NEs 130-136 for enhancing routing or processing capacities. The number of NEs can grow into hundreds or thousands depending on the network service demand. Dotted lines of NEs 138-140 as well as connections 192-196 illustrate that they are newly added or will be added. It should be noted that NEs can also be generally referred to as network devices and/or network systems.

During an exemplary operation, when user 106 sends a packet to user 108, the packet travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed, monitored, and maintained. To monitor network performance, CO 116 using, for example, an NMS 152 to monitor status of every NE within switching network 104.

CO 116, in one example, includes NMS 152, computers or servers 156-158, network administrator 162. NMS 152, in one aspect, includes the EDCS wherein the EDCS can be implemented by software, firmware, hardware, or combination of software, firmware, and hardware. EDCS, in one embodiment, includes standard error code 164, enhanced diagnostic code 166, and registered devices 163. Registered devices, which can be NMSs and/or NEs, indicate that they are EDCS capable network devices. While standard error code can be error code that specifies by a standard network protocol, the enhanced diagnostic code is defined by proprietary or enterprise. For example, the content of enhanced diagnostic code may be defined by a user or device manufacture.

Some or all of NEs 130-140, in one embodiment, are configured to implement the EDCS for handling enhanced diagnostic code. For example, NE 132 includes a record storing network manager identifier ("ID") 142, standard error code 144, and enhanced diagnostic code 146. In one embodiment, NMS 152 and NEs 130-140 perform an initialization process, handshake process, and/or initial provisioning to identify which devices are capable of performing the EDCS and which devices can only handle standard error message. The handshake information or initializing information is stored in a database such as database 154 in NMS 152.

Servers or computers 156-158 can be any types of digital processing servers, personal computers ("PCs"), workstations, etc, and are configured to perform handshake process, discovering enhanced diagnostic codes for different NEs, storing enterprise diagnostic information, and retrieving enterprise and standard error information in database 154. It should be noted that some or all functions of NMS 152 may be integrated into each NE. Alternatively, a group of NEs may be managed by one manager such as NMS 152.

An advantage of using EDCS is that it uses SNMP for provisioning and provides diagnostic information via a SNMP response to assist and/or simplify debugging process when a provisioning failure occurs.

Figure 2:
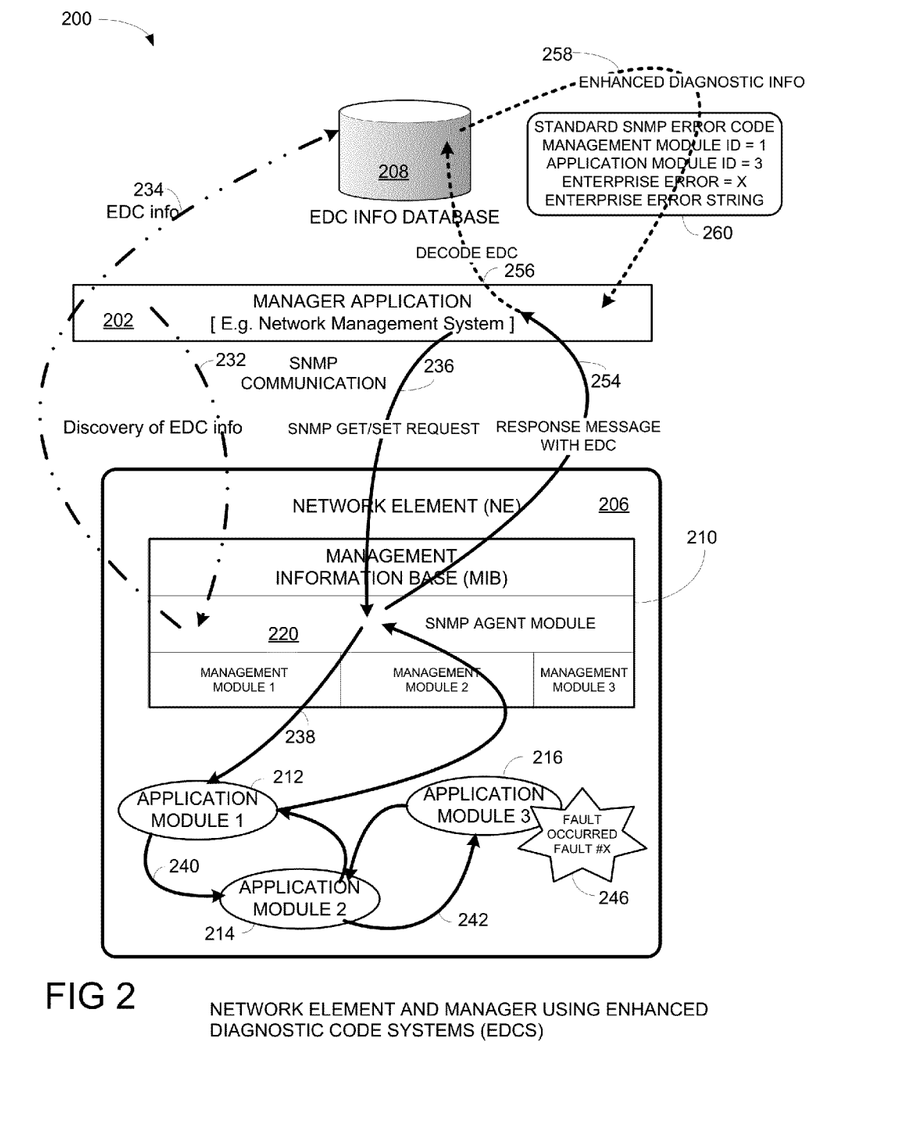
FIG. 2 is block diagram illustrating a network having network management system ("NMS") and a network element ("NE") configured to operate EDCS in accordance with one embodiment of the present invention.

FIG. 2 is a block diagram 200 illustrating a network configuration having an NMS and an NE configured to implement EDCS in accordance with one embodiment of the present invention. Diagram 200 includes an NMS 202, an NE 206, and a database 208. Database 208, in an alternative embodiment, can reside in NMS 202. Database 208 can also reside remotely. NMS 202, NE 206, and database 208 are connected by a communications network. It should be noted that the underlying concept of the exemplary embodiment(s) of the present invention would not change if one or more blocks (or devices) were added to or removed from diagram 200.

NMS 202, which is coupled to database 208, facilitates and/or implements the EDCS. The EDCS, in one embodiment, provides debugging assistance using a standard network protocol such as SNMP during a provisional and/or network discovery process. The EDCS includes a standard error code and an enhanced diagnostic code, and can be coded in compliance with an existing network protocol such as SNMP. While standard error code may be defined by the network protocol, the enhanced diagnostic code can be defined by proprietary(s), user(s), or enterprise(s) as additional specific error notifications. It should be noted that the proprietary or enterprise can be a user, network provider, network administrator, device manufacture, and the like.

To activate the EDCS, an initial handshake process is required to identify which network devices are capable of operating the EDCS. Note that the initial handshake process can also be referred to as an initial error code registration phase between NMS and NE(s). Note that the initial handshake process, in one example, should be completed before the device or network provisioning procedures can start.

NMS 202, which can also be referred to as a manager, network manager, or network controller, can be software, firmware, hardware, or a combination of software, firmware, and hardware. NMS 202 manages one or more NEs attached to the communications network using a standard network protocol such as a SNMP. To simplify the foregoing discussion, SNMP is used throughout the description. Note that the underlying concept of embodiment does not change if other standard network protocols are used in place of SNMP.

SNMP is a standard Internet protocol used for managing network devices that are attached to the network. In the SNMP network, one or more NMSs may be used to monitor one or more managed devices which are also known as NEs, agents, hosts, or attached network devices via a communications network. For example, NMS 202 uses SNMP to manage network-attached devices such as NEs to facilitate network services.

Managed devices such as NE 206 includes management information base ("MIB") containing SNMP agent information and is allowed to be managed and modified by NMS via SNMP commends or messages. It should be noted that a managed device can be any type of network attached device, such as a router, switch, bridge, hub, and/or a combination of router, switch, bridge, and hub. A managed device such as NE 206 may include one or more agents wherein each agent may further include one or more modules.

To facilitate network management, SNMP specifies protocol data units ("PDUs") such as GET, SET, GET-NEXT, GET-RESPONSE, or RESPONSE. For example, an NMS sends a request such as GET PDU from an available source port to an input port in an agent. The agent's response such as GET-RESPONSE or RESPONSE PDU is subsequently composed and responded back to the NMS. It should be noted that PDU is an effective way to deliver information which can be addresses, data, as well as controlling commands between attached network devices or peer entities of a network.

GET, for example, can be used to instruct an agent to retrieve certain value(s). While SET may be used to set or change a value in an agent, GET-NEXT is used to discover values. RESPONSE and/or GET-RESPONSE, on the other hand, is used to respond to a manager or network manager.

NE 206 includes management information base ("MIB") 210 and multiple application modules 212-216. NE 206, in one embodiment, is capable of handling or performing EDCS, wherein NE 206 is registered or initialized to implement the EDCS during an initial handshake process. For example, NE is capable of providing a standard error code and an enhanced diagnostic code embedded in a response message such as a GET-RESPONSE to NMS 202 via the communications network when an operation failure occurs.

MIB 206 includes an SNMP agent module 220 wherein module 220 further includes multiple sub-modules such as management module 1, management module 2, and management module 3. It should be noted that MIB 206 could contain additional module or sub-modules. MIB 206, in one example, can be a virtual database used for managing the entities or network devices in a communications network.

NE 206, in one embodiment, includes a monitor and a diagnostic module. The monitor is configured to detect an operation failure during a provisioning process. The diagnostic module is able to generate a GET-RESPONSE containing a standard error code and an enhanced diagnostic code when the operation failure is detected. The enhanced diagnostic code, in one aspect, represents diagnostic information relating to the operation failure. NMS 202 includes a decoder which is configured to identify the enhanced diagnostic code extracted from the GET-RESPONSE sent from NE 206 in accordance with a reference table containing diagnostic information in database 208 that was populated using an initial discovery process to the NE.

To operate the EDCS, NMS 202, in one embodiment, initiates an initial handshake process 232 to identify which attached NEs are capable of performing the EDCS. Upon identifying NEs that are capable of handling enhanced diagnostic code, the enhanced diagnostic code information from each NE is copied to database 208 as indicated by arrow 234. Database 208 builds and stores records associated with an NE which includes the enhanced diagnostic information that will subsequently be used to decode enhanced diagnostic codes in GET-RESPONSE sent from the NE 206. For example, an enhanced diagnostic record may include, management module identifier ("ID") that is causing the failure of provisioning request, application module ID, enterprise specific error code and elaborate text/details of what this enterprise specific error code means.

After completion of the initial handshake process, NMS 202 activates a network provisioning process 236 to provision NE 206. When provisioning process reaches to SNMP agent module 220 assuming that module 220 is just one of many agent modules, the provisioning process initializes or provisions application module 1, which in turn relays a request to application module 2, and this in turn relays a request to application module 3 as indicated by arrows 238-242. A fault or operation error 246 occurs during the operation of provisioning application module 3. When SNMP agent module 220 monitors and detects fault 246, a diagnostic module, not shown in FIG. 2, collects identifying information relating to module 220, application module 3, and fault 246 which indicate source, location, and error type. After composing a Response that includes an enhanced diagnostic code which identifies source, location, and error type of fault 246, the Response is forwarded to NMS 202 as indicated by arrow 254 via the communications network. After receipt of the Response, NMS 202 searches EDCS database 208 to identify the enhanced diagnostic information associated with NE 202. Once the record associated with NE 202 is retrieved from database 208 as indicated by arrow 258, an error diagnostic information table 260 can be determined in accordance with the error data or enhanced diagnostic code in the Response.

An advantage of employing the EDCS is that when a provisioning operation fails, the software module ID that caused the failure and diagnostic code that indicates error type are returned in addition to the standard error code.

Figure 3:
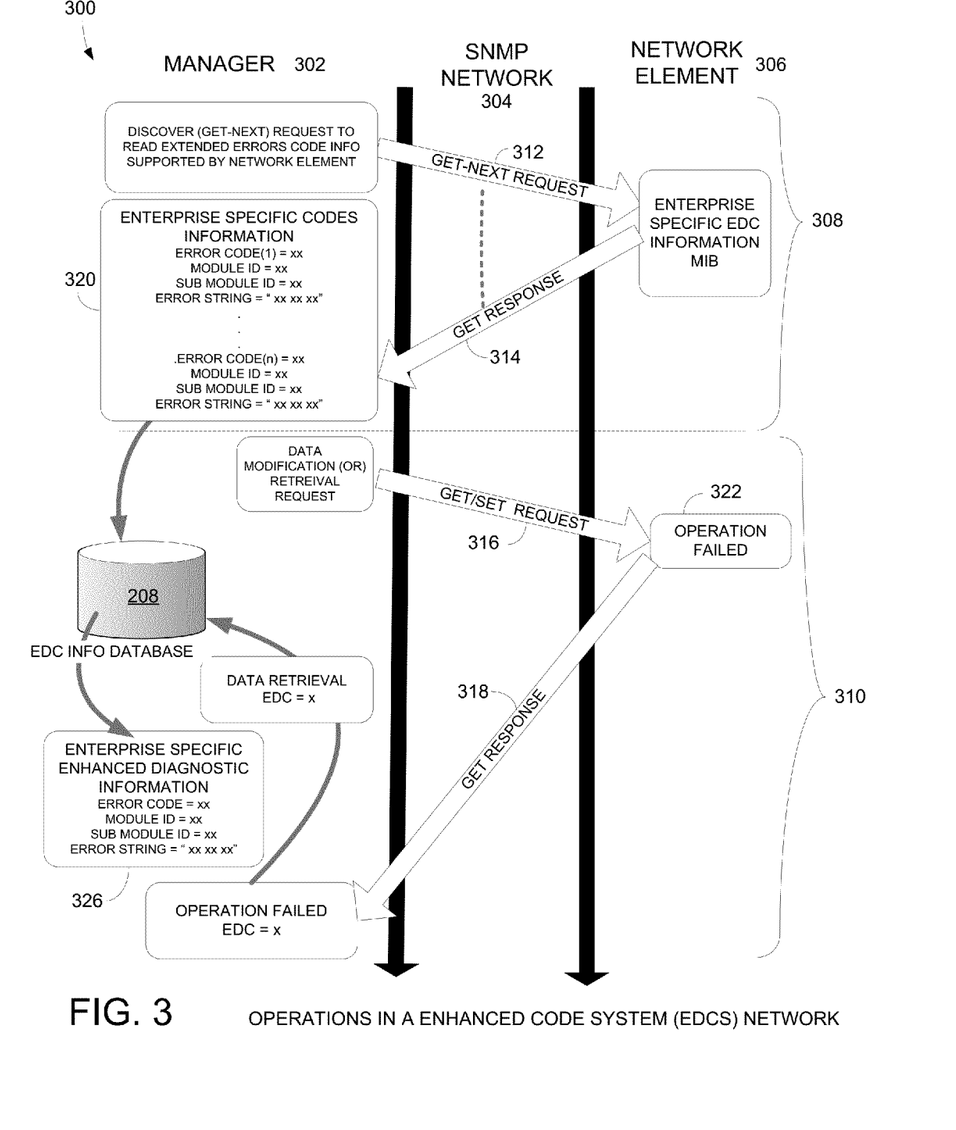
FIG. 3 is a block diagram illustrating a network communication between network devices capable of operating EDCS in accordance with one embodiment of the present invention.

FIG. 3 is a block diagram 300 illustrating a network communication between network devices configured to implement the EDCS in accordance with one embodiment of the present invention. Diagram 300 illustrates a manager 302, SNMP network 304, and an NE 306. During an initial handshake process 308, manager 302, which can also be referred to as NMS, sends a GET-NEXT Request 312 to NE 306 as a discovery request to read the enhanced diagnostic information supported by NE 306. Upon retrieving enterprise specific debug information from MIB, NE 306 sends a GET-RESPONSE 314 which carries the retrieved enterprise specific enhanced diagnostic information or enterprise specific error information to manager 302. After receipt of GET-RESPONSE 314, manager 302 establishes enterprise specific enhanced diagnostic information 320 also known as record in its database 208. It should be noted that enterprise specific enhanced diagnostic information 320 includes relevant diagnostic debugging information, such as error code, module ID, sub-module ID, error string, and the like.

Upon completion of handshake process 308, manager 302 forwards a GET/SET Request 316 indicating data retrieval/modification to NE 306 during a network discovery or network provisioning process 310. After detecting an operation failure 322, NE 306 embeds or inserts the enhanced diagnostic code in GET-RESPONSE 318 which is subsequently forwarded to manager 302. Upon receipt of GET-RESPONSE 318, manager 302 retrieves enterprise specific enhanced diagnostic information from database 208 based on the enhanced diagnostic code in GET-RESPONSE 318. After obtaining the enterprise specific enhanced diagnostic information which is also known as the record, an error diagnostic information table 326 which identifies source, location, and error type can be established. As such, a network administrator can debug or fix the operation failure 322 in accordance with error diagnostic information table 326.

An advantage of using the EDCS is that it allows a manager or NMS to receive and/or process additional diagnostic information to locate source of the error thereby enabling a user to fix the error in a timely manner.

Figure 4:
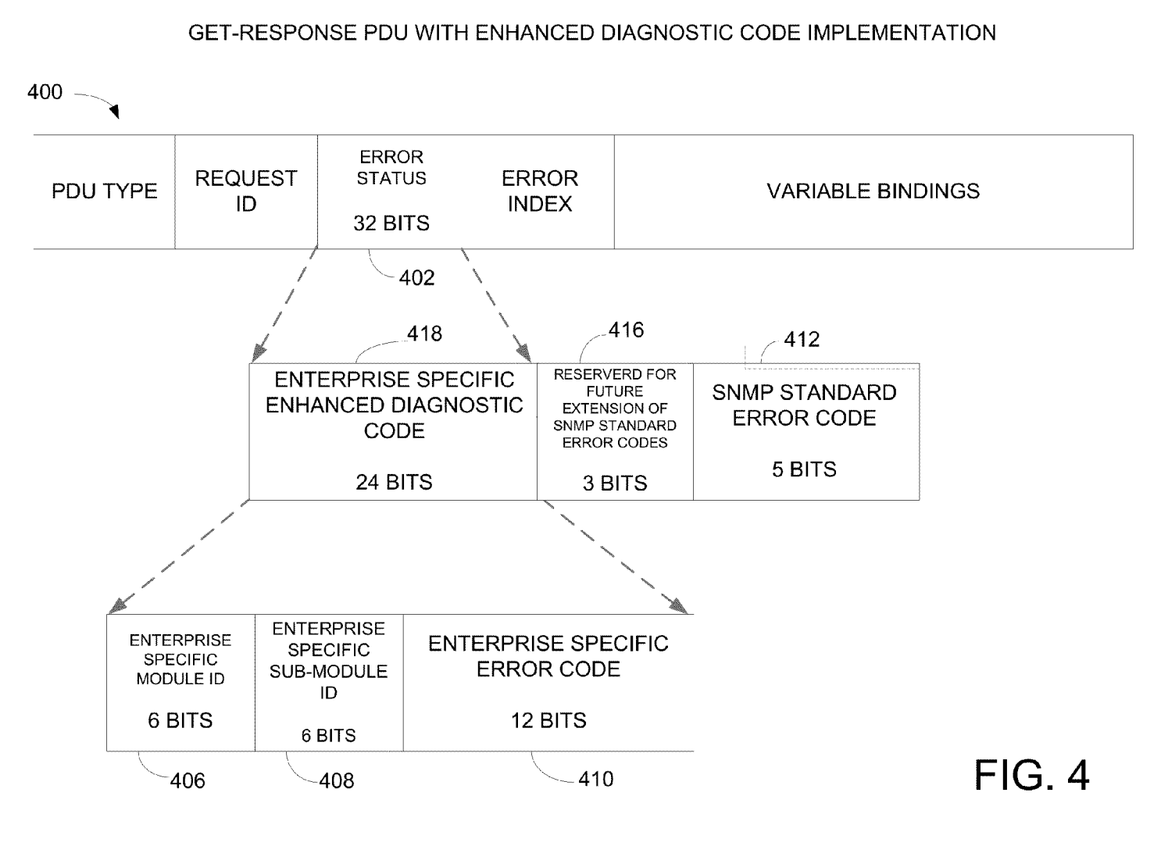
FIG. 4 is a block diagram illustrating a GET-RESPONSE PDU with enhanced diagnostic code used to facilitate EDCS faster debugging of faults in a network in accordance with one embodiment of the present invention.
Figure 5:
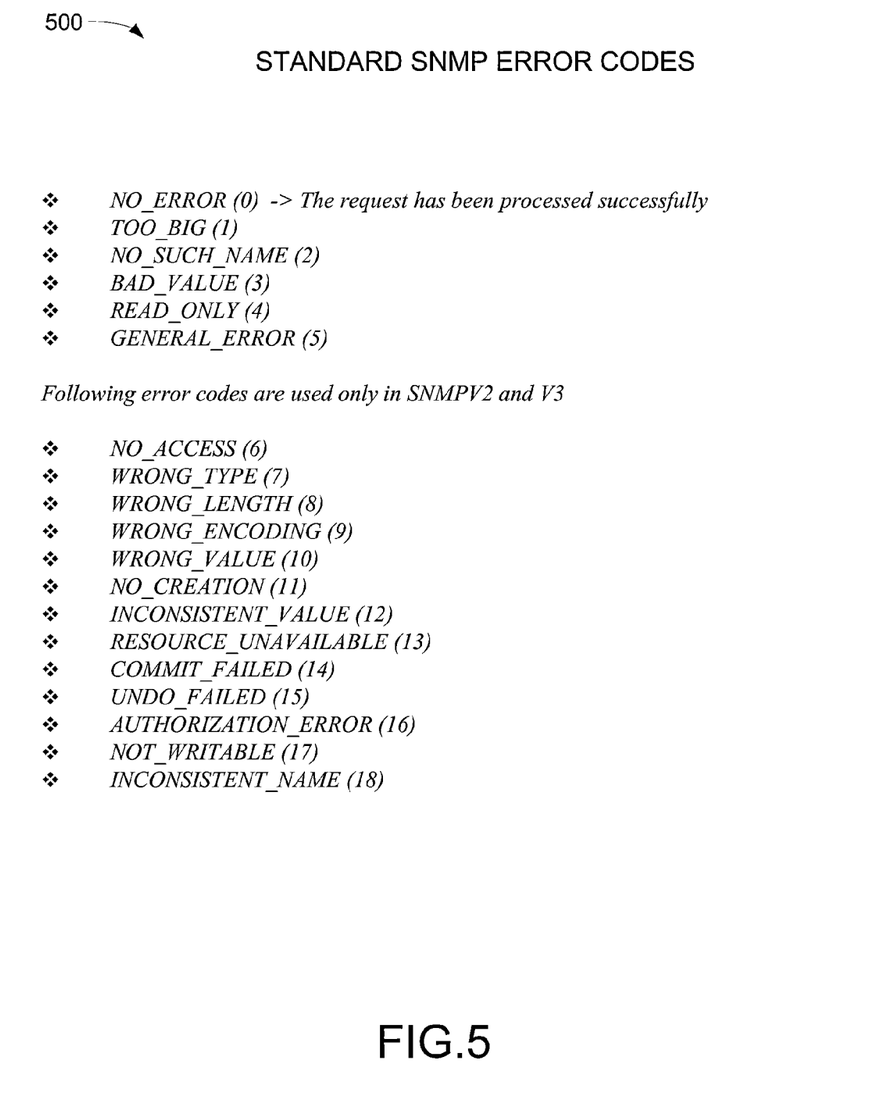
FIG. 5 is a table illustrating an exemplary standard SNMP error codes able to be used to identify error together with enhanced diagnostic code in accordance with one embodiment of the present invention.

FIG. 4 is a block diagram illustrating a GET-RESPONSE PDU 400 with enhanced diagnostic code used to facilitate the EDCS in accordance with one embodiment of the present invention. GET-RESPONSE PDU 400 includes a PDU type field, request ID field, error status field, error index field, and variable binding field. GET-RESPONSE PDU 400 is an SNMP response PDU that contains a 32-bit error status field 402. Since SNMP standard provides a set of 18 error codes as shown in FIG. 5, the maximum number of bits required to encode or represent 18 error codes is five (5) bits 412. After leaving three (3) bits 416 for future expansion, the remaining 24 bits 418 can be allocated to represent diagnostic information. In one embodiment, the first six (6) bits as indicated by numeral 406 are used to indicate enterprise specific module ID and the next six (6) bits as indicated by numeral 408 after module ID are used to indicate enterprise specific sub-module ID. The remaining 12 bits as indicated by numeral 410 after the sub-module ID are used for enterprise specific error code. Note that the numbers of bits allocated to carry individual pieces of enhanced diagnostic information is just for illustration purpose and the actual implementation of EDCS may use varied number of bits for individual piece of diagnostic information according to the requirements of a specific system.

FIG. 5 is a table 500 illustrating an exemplary set of standard SNMP error code used to identify error together with the enhanced diagnostic code in accordance with one embodiment of the present invention. Table 500 shows a standard SNMP error codes which are used to identify error. For instance, error code 0 indicates no error while error code 16 indicates authorization error. It should be noted that the content of table 500 could change if other standard protocol is used instead of SNMP.

Figure 6:
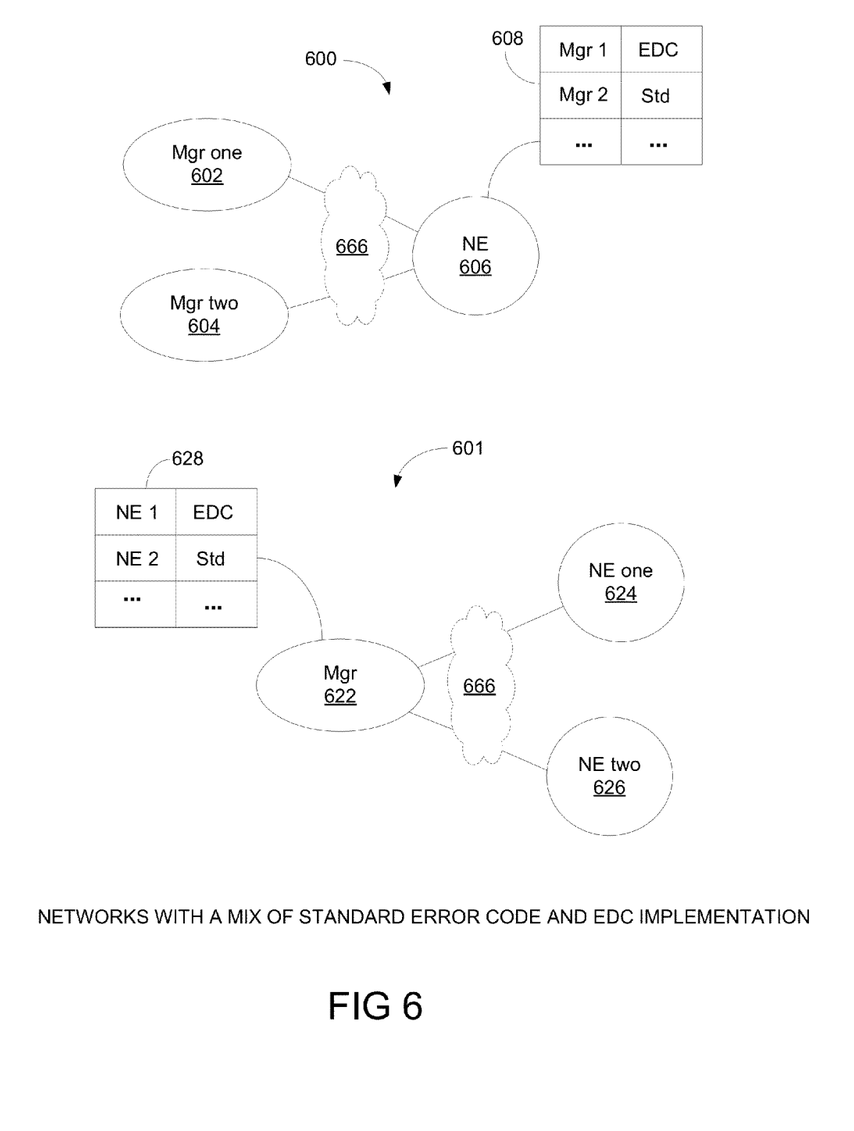
FIG. 6 illustrate two block diagram illustrating device configurations using local records to implement EDCS in accordance with one embodiment of the present invention.

FIG. 6 illustrates two block diagrams 600-601 illustrating device configurations using local records to implement EDCS in accordance with one embodiment of the present invention. Diagram 600 includes a manager one 602, manage two 604, and an NE 606 wherein managers 602-604 and NE 606 are coupled via a network 666. During the initial handshake process, NE 606 discovers that manager one 602 is enhanced diagnostic code capable or EDCS capable, while manager two 604 is standard error capable. To track and remember enhanced diagnostic code capability, NE 606 generates an EDCS record 608 to keep track of which managers or NMSs are EDCS or enhanced diagnostic code capable. For example, EDCS record 608 indicates that manager one is enhanced diagnostic code capable while manager two is standard error code capable.

Diagram 601 includes a manager 622, NE one 624, and NE two 626 wherein manager 622 and NEs 624-626 are coupled via network 666. During the initial handshake process, manager 622 discovers that NE one 624 is enhanced diagnostic code capable while NE two 626 is standard error capable. To track enhanced diagnostic code or EDCS capability, manager 626 generates an EDCS record 628 to keep track of which NEs are enhanced diagnostic code capable. For example, EDCS record 628 indicates that NE one 624 is enhanced diagnostic code capable while NE two 626 is standard error code. It should be noted that records 608 and 628 can be useful in determining whether the enhanced diagnostic code should be embedded in a GET-RESPONSE during the process of composing the Response.

Figure 7:
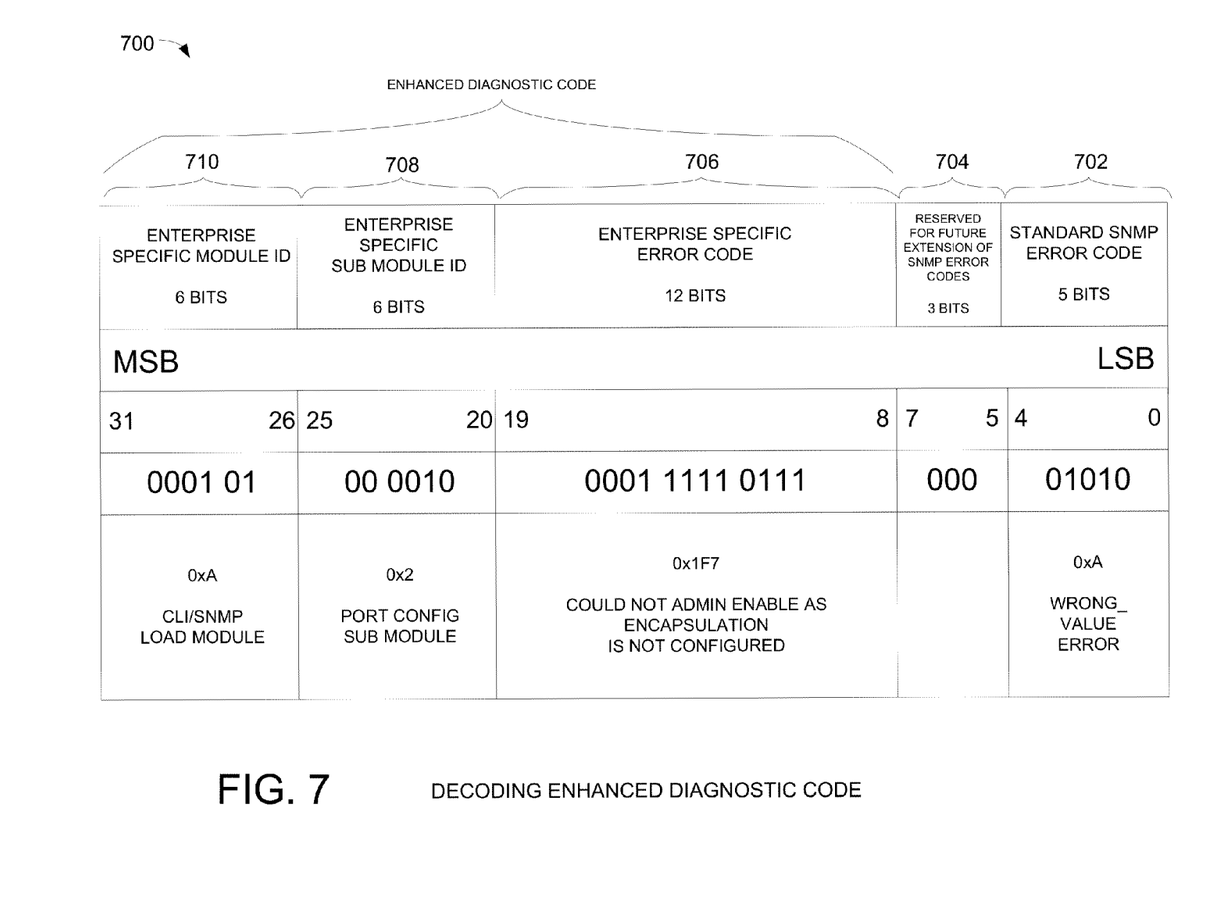
FIG. 7 illustrates a process of decoding an enhanced diagnostic code (EDC) in accordance with one embodiment of the present invention.

FIG. 7 illustrates a process of decoding an enhanced diagnostic code 700 in accordance with one embodiment of the present invention. Enhanced diagnostic code 700 includes a total of 32 bits wherein bit position zero (0) is the least significant bit ("LSB") and bit position 31 is the most significant bit ("MSB"). Enhanced diagnostic code 700 is formatted in accordance with SNMP and includes a first field 702 from bit position 0 to bit position 4 used for storing standard SNMP error code as described in FIG. 5. A 3-bit field 704 from bit position 5 to bit position 7 of enhanced diagnostic code 700 is reserved for the future expansion of SNMP error codes. A 12-bit field 706 from bit position 8 to bit position 19 of enhanced diagnostic code 700 is used for enterprise specific error code. Also, enterprise specific sub module ID 708 from bit position 20 to bit position 25 is used for identifying a module that has caused the failure. Enterprise specific module ID 710 occupies a 6-bit field from bit position 26 to bit position 31 is used for identifying a location relating to the module.

Upon receipt of enhanced diagnostic code 700, a decoder, which may reside in NMS, reads standard error code from field 702 from bit position 0 to bit position 4 of enhanced diagnostic code 700. Since field 702 contains a binary value of "01010", the decoder is able to obtain the error message of "wrong value error" according to table 500 shown in FIG. 5. To identify source module with the "wrong value error," the decoder extracts a binary value of "000101" from field 710 to identify source module associated with the "wrong value error." For example, the binary value of "000101" indicates a load module. After identifying a source module as the load module, the decoder can obtain port number from reading field 708. Since field 708 contains binary value of "000010", the port configuration as sub-module is identified. Field 706 contains a binary value of "0001 1111 0111" which indicates that encapsulation is not configured. When a network administrator, for example, notices an operation failure and the failure likely occurred at the port configuration of load module in which encapsulation is not configured, the failure may be identified and fixed based on the error information in the enhanced diagnostic code.

The exemplary aspect of the present invention includes various processing steps, which will be described below. The steps of the aspect may be embodied in machine or computer executable instructions. The instructions can be used to direct a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 8:
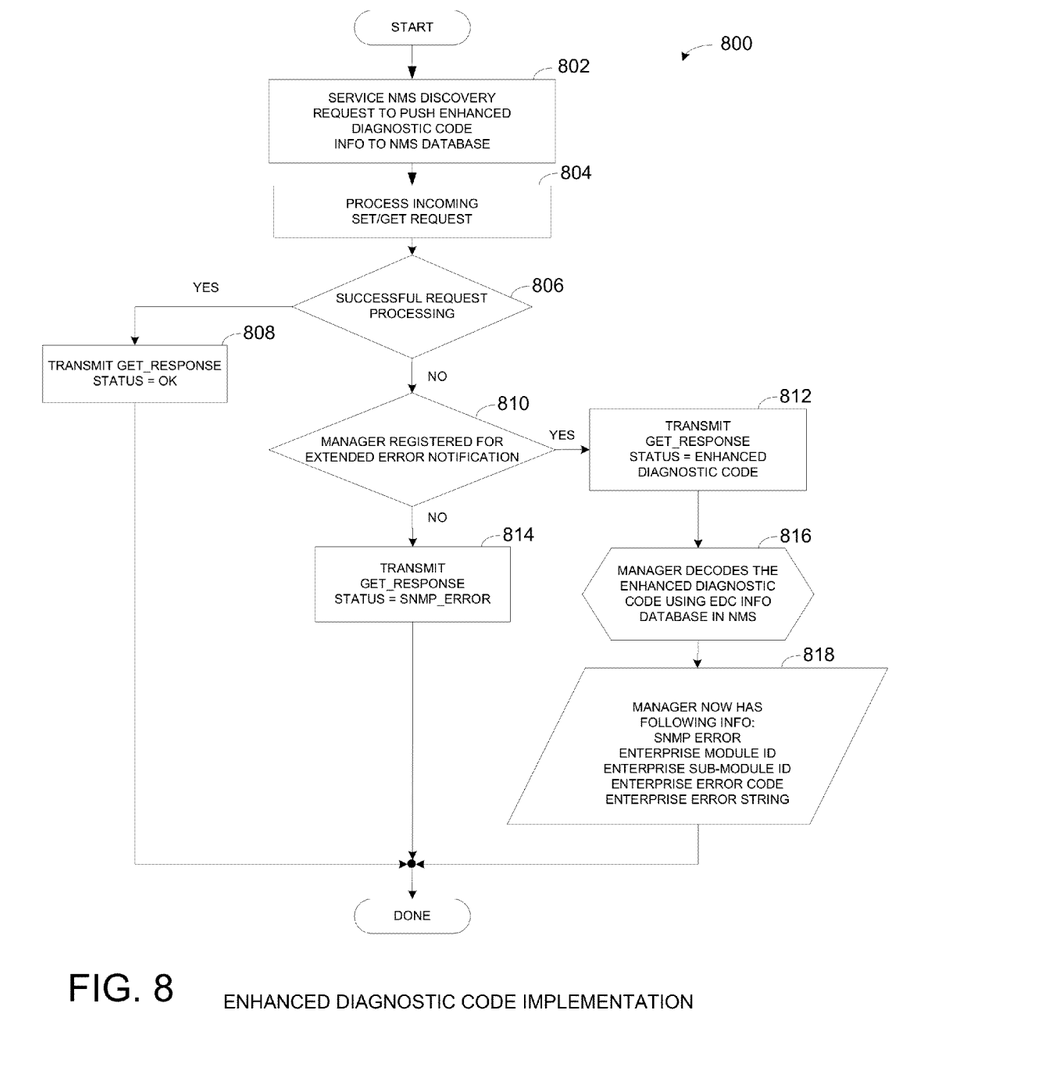
FIG. 8 is a flowchart illustrating an exemplary logic process of implementing EDCS in accordance with one embodiment of the present invention.

FIG. 8 is a flowchart 800 illustrating an exemplary logic process of implementing EDCS in accordance with one embodiment of the present invention. At block 802, the logic process activates an initial handshake procedure also referred to as a service NMS discovery. Upon requesting and obtaining relevant enhanced diagnostic information, the collected enhanced diagnostic information associated with NEs are pushed or stored in an NMS database.

After completion of the handshake procedure, the process, at block 804, processes an incoming SET or GET Request. If the request is processed successfully at block 806, the process proceeds to block 808 to transmit a GET-RESPONSE with "Okay" status or NO_ERROR status to NMS. If, however, an error occurs during the processing of the request at block 806, the process proceeds to block 810 to determine whether the NMS is registered for the enhanced diagnostic code notification. If the NMS is not registered for the enhanced diagnostic code notification, the process moves to block 814. At block 814, the process embeds a standard error code in GET-RESPONSE and forwards the response to the NMS or manager. If, however, the NMS is registered at block 810 to receive enhanced diagnostic codes, the process embeds or composes a standard error code and an enhanced diagnostic code in the GET-RESPONSE and subsequently forwards the response to the NMS at block 812. Upon receipt of the GET-RESPONSE, the NMS or manager, at block 816, decodes the enhanced diagnostic code using enhanced diagnostic information stored in the database. The enhanced diagnostic information containing standard error code, enterprise module ID, enterprise sub-module ID, enterprise error code, and enterprise error string is obtained by the manager at block 818.

Figure 9:
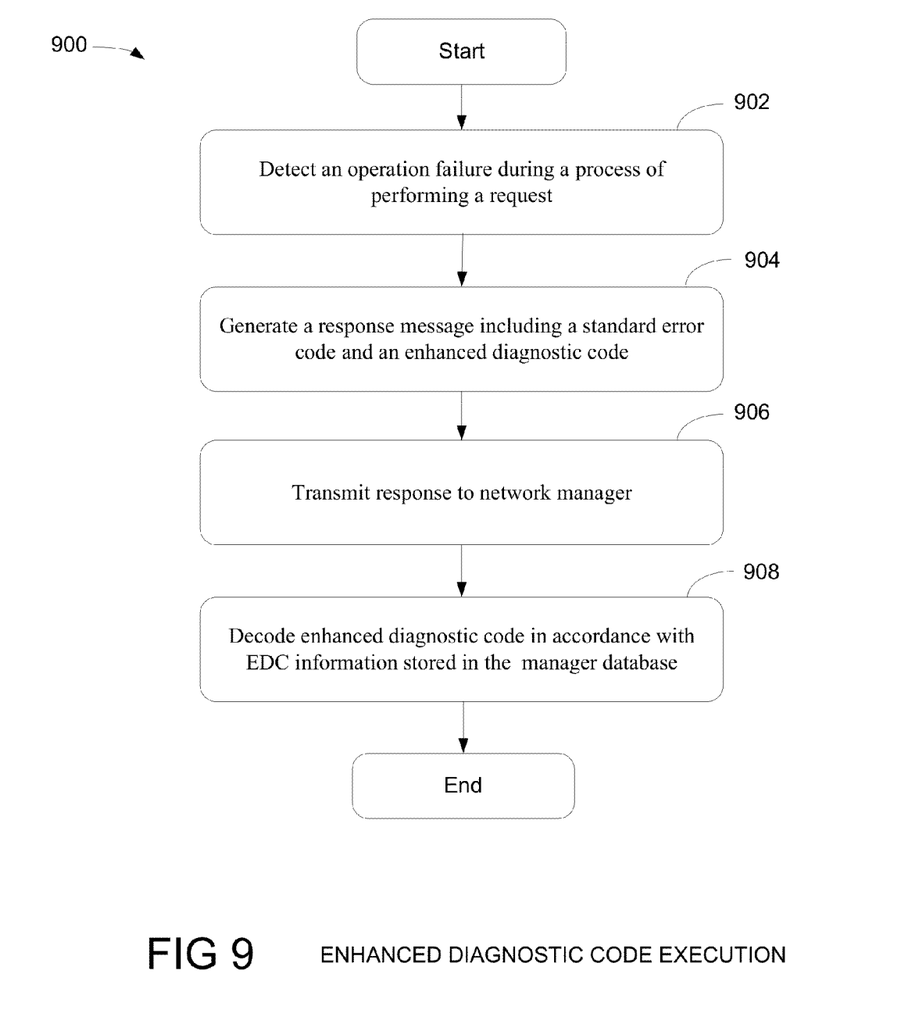
FIG. 9 is a flowchart illustrating a simplified logic process able to facilitate and execute at least a portion of EDCS in accordance with one embodiment of the present invention.

FIG. 9 is a flowchart 900 illustrating a simplified logic process that can facilitate and execute at least a portion of EDCS in accordance with one embodiment of the present invention. At block 902, a process configured to manage a network detects an operation failure during an execution or performance of a request such as GET/SET request sent from a network manager. To facilitate execution of the EDCS, an initial handshake process needs to be processed to register enhanced diagnostic code notification. After identifying NEs that are capable of providing enhanced diagnostic code via an initial error code registration phase, each NE is registered and requested to supply enhanced diagnostic code when an error occurs. Information relating to the NEs and enhanced diagnostic information is stored in the database as enhanced diagnostic code reference table. Note that the enhanced diagnostic code reference table can also be referred as a record. In one aspect, the NMS sends a GET or SET request message formatted in SNMP to the NE. The GET or SET request message formatted in SNMP can also be referred as GET or SET SNMP PDU. After detecting an error, an operation failure is issued.

At block 904, a response message such as GET-RESPONSE, which includes a standard error code and an enhanced diagnostic code containing diagnostic information associated with the operation failure, is generated when an enhanced diagnostic code notification is registered by the network manager. For example, the process is capable of generating a response message which may be a GET-RESPONSE PDU embedded in the enhanced diagnostic code. At block 906, the response is transmitted to the network manager via a communications network.

At block 908, upon receipt of the response such as GET-RESPONSE PDU, the enhanced diagnostic code is decoded in accordance with enhanced diagnostic information stored in a database. In one embodiment, module ID, sub-module ID, and application specific error code are identified in response to the enhanced diagnostic code in the database. The 32-bit error status bits are identified in a GET-RESPONSE formatted in SNMP PDU. Note that the first six (6) bits of the 32-bit error status bits indicate the module ID and the next six (6) bits of the 32-bit error status indicate the sub-module ID. The process is further able to locate twelve (12) bits following the sub-module ID in the 32-bit error status bits as application specific error code and the last five (5) bits of the 32-bit error status bits as a standard SNMP error code.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for managing a communications network, comprising:
    activating an initial handshake process by a network manager prior to a network provisioning process to identify network elements ("NEs") capable of implementing enhanced diagnostic code system ("EDCS") and registering a first NE of the NEs indicating able to handle the EDCS;
    detecting an operation failure associated with the first NE during the network provisioning process of performing a request sent from the network manager;
    generating a response message including a standard error code and an enhanced diagnostic code indicating failure diagnostic information associated with the operation failure;
    transmitting the response message from the first NE to the network manager via a communications network; and
    decoding the enhanced diagnostic code in accordance with enhanced diagnostic information stored in a manager database of the network manager upon receipt of the response message by the network manager.

2. The method of claim 1, further comprising identifying an enhanced diagnostic code and a module identification ("ID") in response to the enhanced diagnostic code and the database.

3. The method of claim 2, further comprising identifying a sub-module ID and an application specific error code in response to the enhanced diagnostic code and the database.

4. The method of claim 1, further comprising identifying a 32-bit error status bits in a GET-RESPONSE formatted in protocol data unit ("PDU"), wherein first six (6) bits of the 32-bit error status bits indicate the module ID and the next six (6) bits of the 32-bit error status indicate the sub-module ID.

5. The method of claim 4, further comprising locating next twelve (12) bits following the sub-module ID in the 32-bit error status bits as application specific error code and last five (5) bits of the 32-bit error status bits as a standard error code.

6. The method of claim 1, further comprising:
    initializing an enhanced diagnostic code system ("EDCS") registration with the NEs and requesting the NEs to supply enhanced diagnostic codes when an error occurs; and
    storing information relating to the NEs and enhanced diagnostic information in the database as enhanced diagnostic information reference table.

7. The method of claim 1, wherein detecting an operation failure includes:
    receiving one of GET and SET request message formatted in Simple Network Management Protocol ("SNMP") sent from a network management system ("NMS"); and
    issuing the operation failure during a process of implementing the one of GET and SET request.

8. The method of claim 7, wherein generating a response message includes composing a GET-RESPONSE protocol data unit ("PDU") with the enhanced diagnostic code coded in SNMP.

9. The method of claim 8, wherein decoding the enhanced diagnostic code in accordance with enhanced diagnostic information stored in a database includes:
    searching records in the database in the NMS in accordance with information in the GET-RESPONSE PDU; and
    identifying specific diagnostic information based on the enhanced diagnostic code in the GET-RESPONSE PDU in view of the records.

10. The method of claim 9, wherein identifying specific codes information includes identifying module identification ("ID"), a sub-module ID, and an application specific error code based on information in the GET-RESPONSE PDU in view of the database.

11. A method for managing a network device, comprising:
    activating an initial handshake process by a manager prior to provisioning process to identity and register enhanced diagnostic code system ("EDCS") with a network element ("NE");
    detecting an operation failure during the device provisioning process of performing GET request formatted in Simple Network Management Protocol ("SNMP") from the manager;
    generating a GET-RESPONSE coded in SNMP including a standard error code and an enhanced diagnostic code indicating failure diagnostic information associated with the operation failure when an enhanced diagnostic notification is registered;
    transmitting the GET-RESPONSE to the manager from the NE; and
    decoding the enhanced diagnostic code in accordance with enhanced diagnostic information stored in a database of the manager upon receipt of the GET-RESPONSE by the manager.

12. The method of claim 11, wherein generating a GET-RESPONSE coded in SNMP includes assigning a standard error notification.

13. The method of claim 12, further comprising generating an enhanced diagnostic code and a module identification ("ID") in response to the enhanced diagnostic code and the database; and generating a sub-module ID and an error string in response to the enhanced diagnostic code and the database.

14. The method of claim 12, further comprising:
    identifying one or more NEs capable of providing enhanced diagnostic code during an initial error code registration phase;
    initializing an enhanced diagnostic code system ("EDCS") registration with the NEs and requesting the NEs to supply enhanced diagnostic codes when an error occurs; and
    storing information relating to the NEs and enhanced diagnostic information in the database as enhanced diagnostic information reference table.

15. The method of claim 14, wherein generating a response includes composing a GET-RESPONSE protocol data unit ("PDU") containing enhanced diagnostic code formatted in SNMP.

16. The method of claim 15, wherein decoding the enhanced diagnostic code includes:
- searching relevant data record associated with the NE in the database in accordance with information in the GET-RESPONSE PDU; and
- identifying specific enhanced diagnostic codes information based on the GET-RESPONSE PDU in view of the relevant data record.

17. A network configuration comprising:
- a network management system ("NMS") configured to have a database for facilitating an enhanced diagnostic code system, wherein the database includes enhanced diagnostic information established during an initial handshake process which occurs prior to a provisioning process;
- a communications network coupled to the NMS for transmitting information; and
- a network element ("NE") coupled to the communications network, and able to establish enhanced diagnostic code system ("EDCS") during the initial handshake process, wherein the NE is configured to provide a standard error code and an enhanced diagnostic code embedded in a response message to the NMS if an operation fails during the provisioning process.

18. The network configuration of claim 17, wherein the NE further includes a monitor configured to detect the operation failure during a provisioning process.

19. The network configuration of claim 18, wherein the NE further includes a diagnostic module coupled to the monitor, and able to generate a GET-RESPONSE containing the standard error code and the enhanced diagnostic code, wherein the enhanced diagnostic code represents diagnostic information relating to the operation failure.

20. The network configuration of claim 19, wherein the NMS further includes a decoder configured to identify the enhanced diagnostic code extracted from the GET-RESPONSE sent from the NE in accordance with a reference table containing enhanced diagnostic information in the database.

* * * * *